Dec. 17, 1957 H. E. MUELLER 2,816,419
PROPELLANT DISPLACEMENT GAS GENERATORS
Filed March 7, 1952 2 Sheets-Sheet 1

INVENTOR.
HEINZ E. MUELLER
BY
Bean, Brooks, Buckley & Bean
ATTORNEYS

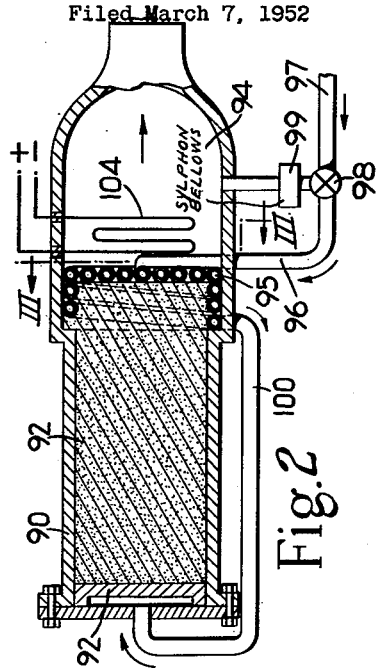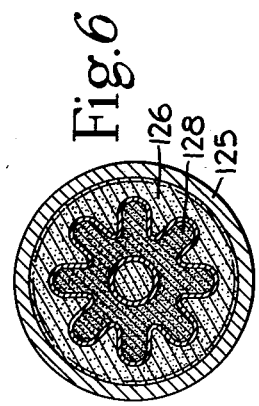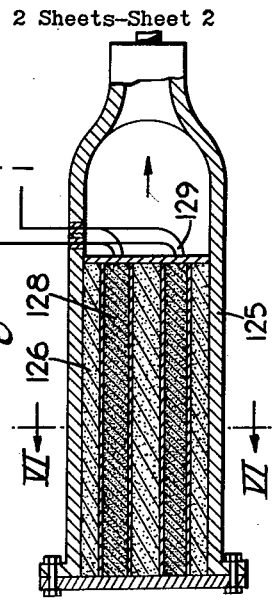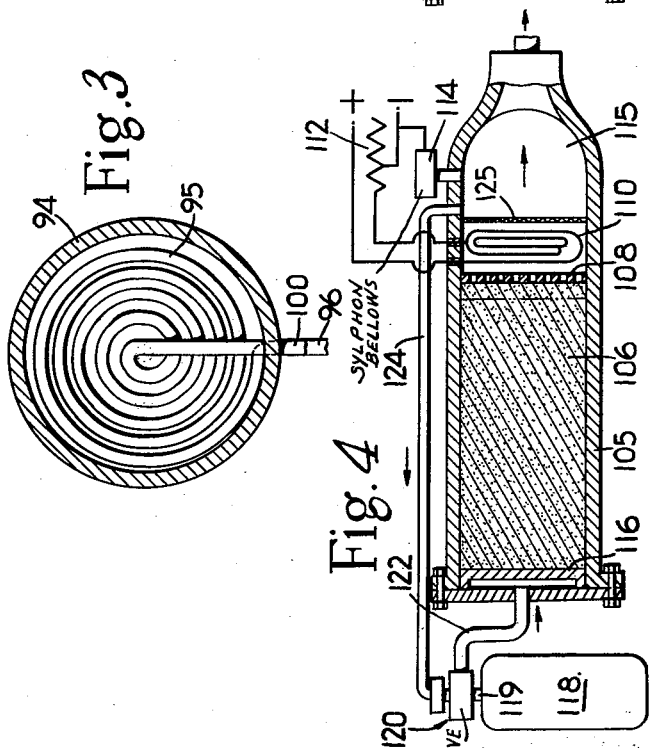
INVENTOR.
HEINZ E. MUELLER
BY
Bean, Brooks, Buckley & Bean.
ATTORNEYS though a mechanical relative displacement arrangement may be preferred, purely chemical equilibrium upsetting mechanisms may be employed for some purposes.

United States Patent Office
2,816,419
Patented Dec. 17, 1957

2,816,419

PROPELLANT DISPLACEMENT GAS GENERATORS

Heinz E. Mueller, Kenmore, N. Y., assignor to Bell Aircraft Corporation, Wheatfield, N. Y.

Application March 7, 1952, Serial No. 275,441

3 Claims. (Cl. 60—37)

This invention relates to fluid fuel jet propulsion systems such as are useful for example in conjunction with rocket motors, and more particularly to improved means in such systems for delivering the propellant substances to the rocket motor combustion chamber.

It has been established that for optimum results the propellant substances such as the fuel and oxidant and catalyst mediums must be fed to the combustion chamber in precise proportions, and that the best means for displacing the propellants from their respective supply vessels for feeding to the combustion chamber is by means of properly controlled gas pressures supplied by suitable inert gas substances. Mechanical arrangements for regulating the pressures of the respective propellant supply systems have invariably proven to be too complex in design and construction and insufficiently reliable in operation; and prior arrangements for employing inert gas pressures for displacing the propellants from their respective supply vessels have also been relatively complicated and cumbersome and inefficient and otherwise undesirable.

The present invention has for its primary object avoidance of the difficulties and disadvantages above referred to, and contemplates a novel propellant displacement system operating in response to gas pressures developed as the result of progressive decomposition of a solid substance which is adapted to evolve large volumes of gas at relatively low temperatures responsive to upsetting of the chemical equilibrium of the solid substance. More particularly, another object of the invention is to provide novel and improved mechanisms for controlling conversion of the solid substance charge into gaseous form and to control the gas evolution rate. Other objects and advantages of the invention will appear from the specification hereinafter.

In the drawing:

Fig. 2 is a sectional view of still another form of gas generator of the invention;

Fig. 3 is a section, on an enlarged scale, taken along line III—III of Fig. 2;

Figs. 4 and 5 are sectional views of still other forms of gas generators of the invention; and Fig. 6 is a sectional view, on an enlarged scale, taken along line VI—VI of Fig. 5.

Figure 1:
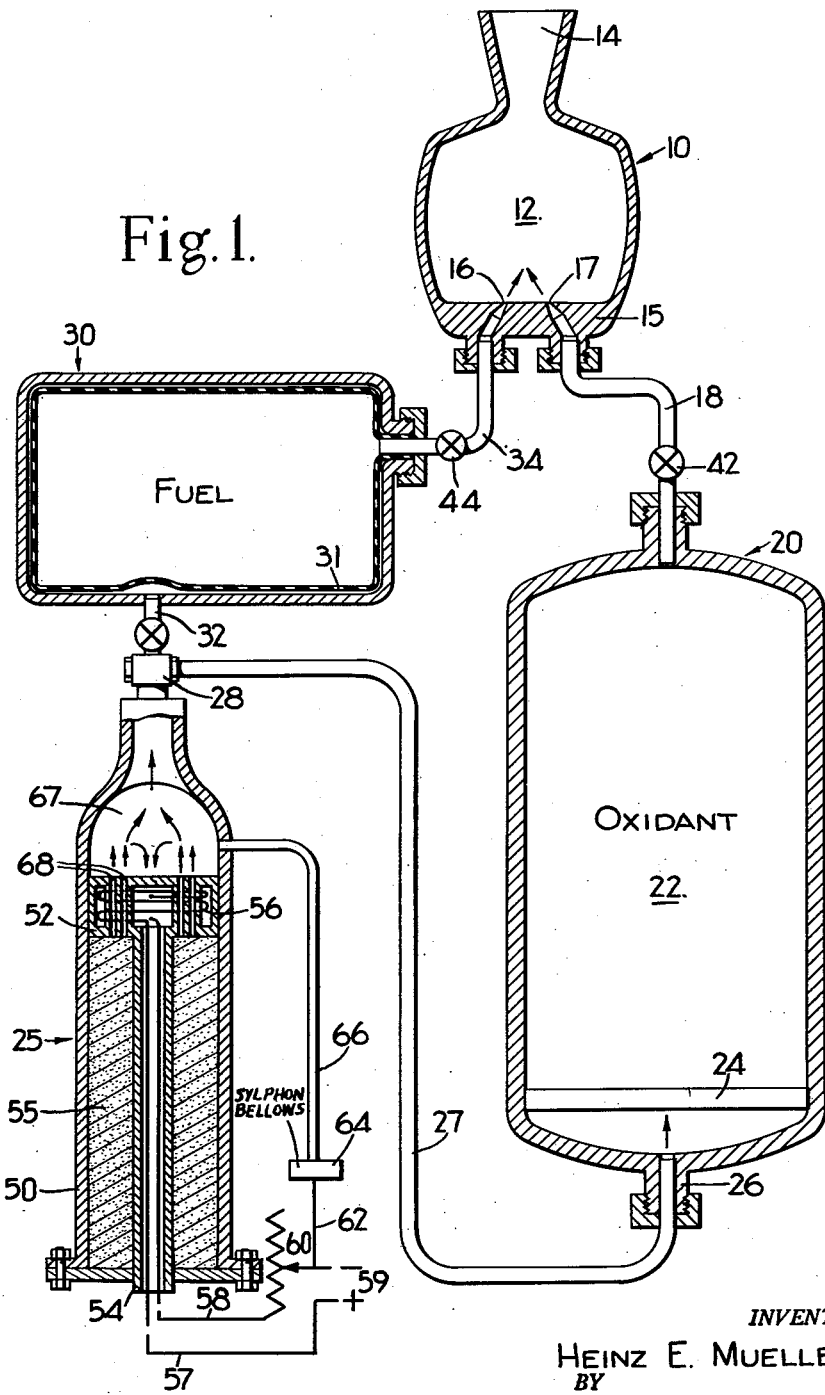
Fig. 1 is a diagrammatic illustration of a rocket motor fluid propellant supply system, showing one form of the gas generator unit of the invention in section.

As shown in Fig. 1, the invention is illustrated as being applied to a rocket motor system wherein the rocket motor per se is indicated generally at 10 and is illustrated as comprising a combustion chamber 12 terminating in a reaction nozzle 14 and having a suitable type "injector head" 15 with fuel and oxidant nozzles 16—17 respectively. Oxidant nozzle 17 is fed by means of a delivery tube 18 connected to the outlet port of a tank 20 which contains a supply of oxidizing substance as indicated at 22 which may be backed up by a gas separating bladder or a movable piston as illustrated at 24. Behind the piston 24 the tank 20 is provided with connection to an inert gas generator unit of the invention as indicated generally by the numeral 25; intercommunication being provided by means of a pressure inlet connection 26 to which is connected one end of a conduit 27 leading from the pressure outlet connection 28 of the pressure generator unit 25. The details of the generator 25 will be more fully explained hereinafter.

The fuel supply tank may be furnished as indicated at 30, and may be arranged to include a gas separating bladder 31 and a pressure inlet connection as indicated at 32; the fuel discharge conduit 34 from the tank 30 having connection into the rocket motor combustion chamber jets 16. If required, a catalyst supply vessel (not shown) may be similarly furnished; a pressure inlet connection being made with the outlet connection 28 and the discharge conduit therefrom being arranged to discharge into the rocket motor combustion chamber as is understood in the art.

Thus, it will be appreciated that gas delivered under pressure by the generator 25 through the manifold 28 may be employed to force the piston 24 in the oxidant tank to displace oxidizer material therefrom into the rocket motor combustion chamber, while at the same time gas pressure from the generator 25 may be similarly employed to force fuel to be displaced from the fuel tank and catalyst (if employed) from the catalyst supply vessel into the rocket motor combustion chamber. Pressure regulating valves as indicated at 42 and 44 may be employed to provide for selective regulation of the rates of delivery of the respective propellants to the rocket motor.

Referring now to the gas generator portion of the system of the invention, it is contemplated to employ as the gas developing substance any suitable solid gas generating substance. For example, one of the ammonium carbonate compounds such as ammonium bicarbonate ($NH_4HCO_3$) or the double salt of ammonium carbonate and ammonium bicarbonate (commercially known as ammonium carbonate), or the like may be employed. Such compounds are under normal conditions in solid form and adapted to decompose at elevated temperatures to volatilize and thereby generate large volumes of relatively low temperature gas with little or no residue. Such materials are readily available, inexpensive, non-toxic, and non-explosive; and may be used either in powder or cake form. The decomposition rate may be readily regulated by any suitable control of the application of heat to the compound; and the compound may be heated by any suitable method such as by an electrical resistance heating element; a heat developing powder cartridge; a combustion material mingled with the gas generant substance; or by application of hot gases derived from any suitable external source, or by action of a catalyst or chemical compound such as hydrazine ($N_2H_4$).

It is contemplated that in arrangements relying upon contact of a heating element (such as an electrical resistance element) with the gas generant substance, the elements may be maintained in the required proximity relation either by moving the heating element toward the gas generant substance or by moving the generant substance toward the heating element, as the gas generating operation progresses. Thus, for example, the heating element and the generant substance may be disposed in relatively movable positions within a suitable container and arranged to be maintained in heat exchange proximity by automatic operation thereon of pressure forces derived from the gas produced by the unit, or from some external source if preferred. Hence, it will be appreciated that the rate of decomposition of the gas generant may be regulated by suitable control of relative displacements of the heating element and the gas generant substance. Also, it will be appreciated that the rate of gas evolution may be regulated if desired by suitable control of the electric current energizing the heating element, such as by means of a switch manually controlled or operating automatically in response to variations of pressure in the generated gas chamber.

By way of an exemplification of the invention a gas generating unit is illustrated in Fig. 1 at 25 as comprising generally a cylindrical container 50 housing therein a movable differential piston 52 formed with a hollow piston rod 54 extending lengthwise through the cylinder 50 and through an aperture at one end thereof. A cake or powder charge of ammonium carbonate compound or the like as indicated at 55 is packed within the cylinder behind the piston and around the piston rod. The piston head 52 is provided with an electrical resistance heating element as indicated at 56 which connects to conductors 57—58 leading through the hollow piston rod to a suitable power source as indicated at 59. The conductor 58 includes a variable rheostat as indicated at 60; the armature of which is positionally adjustable as by means of a linkage 62 extending from a Sylphon bellows 64 coupled by means of a tube 66 into communication with the pressured gas chamber portion 67 of the container 50.

Thus, it will be appreciated that upon energization of the resistance device 56 the piston head 52 will become heated and being in heat exchange contact with the gas generant charge at one end thereof it will cause the heated portion of the gas generant substance to convert into gaseous form. The piston head 52 is perforated as indicated at 68 to permit the generated gas to escape through the piston into the pressure chamber portion 67 of the casing 50; and thus it will be understood that the pressure chamber portion 67 of the casing will become filled with gas under pressure for delivery through the conduits 27—32 for the purposes explained hereinabove. At the same time the development of gas pressure within the chamber portion 67 will operate against the piston head 52 so as to cause the latter to be progressively displaced and maintained in heat contact relation with the gas generant substance charge 55 as the latter is progressively dissipated at the zone of heat exchange relation with the piston head. Thus, the heated piston element of the device is automatically maintained at all times in heat exchange position with the chemical substance as a result of the piston area differences; and as explained hereinabove if automatic control of the gas evolution rate is desired the rheostat 60 may be employed under control of the bellows 64 so that a substantially constant gas pressure will be maintained in the pressure chamber portion 67.

Figs. 2–3 illustrate another form of gas generating unit of the invention wherein the unit comprises a generally cylindrical container 90 into one end of which is packed a gas generant charge as indicated at 92. The other end of the unit container is enlarged as indicated at 94 to comprise the generated gas chamber portion of the unit, and in this portion of the device is mounted a helically wound heat exchange conduit 95 having a hot gas inlet end portion 96 arranged in communication with a hot gas supply conduit 97. A control valve 98 is arranged in the line of the conduit 97 and is coupled to a Sylphon bellows device as indicated at 99 arranged to be responsive to the gas pressures within the chamber portion 94, so as to obtain automatic regulation of the rate of hot gas flow into the heating coil 95 for gas generation control purposes, as explained hereinabove.

The supply conduit 97 will be connected to any suitable hot gas supply source, such as for example the combustion chamber portion of the rocket engine which is arranged to be supplied by propellants through operation of the gas generating unit per se. A branch conduit 100 is connected into the heating coil 95 and arranged to deliver gas therefrom under pressure through an aperture at the rear end of the container 90 and into the space behind a movable piston member 92; whereby it will be understood that the piston member may be maintained under constant pressure to cause it to force the gas generant charge 92 to be moved into constant heat exchange bearing relation against the heating coil 95 as the gas generant substance becomes progressively dissipated. An electrical resistance heating element as indicated at 104 may be arranged within the unit if desired for the purpose of initial heating of the gas generant charge for "starting" purposes; it being understood that after gas pressures are developed and the rocket motor goes into operation the hot gas products of combustion in the combustion chamber thereof will be then available in the conduit 97 to supply heat through the heating coil 95 to the gas generant charge.

Fig. 4 illustrates still another form of gas generator of the invention wherein the unit comprises generally a cylindrical container 105 in which is stored a supply of gas generant substance 106. A heavy wire screen or perforated plate is provided transversely of the interior of the container as indicated at 108, and an electrical resistance heating element as indicated at 110 is arranged to be variably controlled by means of a rheostat as indicated at 112. The rheostat 112 is in turn connected to be regulated by means of a Sylphon bellows 114 or the like arranged in communication with the gas chamber portion 115 of the unit container. Behind the gas generant charge is disposed a movable piston 116 and a gas pressure supply source such as a nitrogen bottle or the like as indicated at 118 is arranged to discharge through a conduit 119, a pressure regulating valve 120; and a conduit 122 into the unit behind the piston 116 so as to cause the latter to constantly maintain a displacement pressure against the gas generant charge so as to force it to remain in heat exchange bearing relation with the perforated barrier 108. The pressure regulator 120 is automatically controlled by the pressure from the gas reservoir portion 115 of the unit, through the conduit 124. A heat reflector screen as indicated at 125 may be employed to keep the heat generated by the element 110 from being undesirably dissipated; the reflector 125 being porous to permit free gas flow therethrough.

Figs. 5–6 illustrate still another form of gas generator of the invention wherein the unit comprises generally a cylindrical container 125 in which is stored a charge of gas generant substance 126. Interiorly of the gas generant charge 126 is embedded a combustible powder charge 128, and electrical resistance heating elements are embedded in the powder charge as indicated at 129. Thus, it will be appreciated that upon energization of the heating elements 129 the powder charge will be ignited so as to cause the latter to slowly burn and to thereby generate heat which will in turn cause the gas generant charge 126 to decompose to provide gas evolution as explained hereinabove.

I claim:

1. A gas generator comprising a container having therein a mass of ammonium carbonate compound adapted to progressively decompose when heated to evolve large quantities of gas, said container including a gas accumulation chamber portion, a heating element disposed within said container, and means operable to relatively displace said mass and said heating element to maintain them in heat exchange relation as decomposition of said mass progresses.

2. A gas generator comprising a container having therein a mass of solid material adapted to decompose when heated to evolve large quantities of gas, and a gas accumulation chamber, a heating coil disposed within said container, and displacement piston means variably operable in response to pressure variations in said chamber to move said mass into continued contact with said heating element to maintain it in heat exchange relation therewith as decomposition of said mass progresses.

3. A gas generator comprising a container having therein a mass of solid material adapted to decompose when heated to evolve large quantities of gas, a gas accumulation chamber, a heating element disposed within said container, differential piston means variably operable in response to pressure variations in said chamber to relatively displace said mass and said heating element to maintain them in heat exchange relation as decomposition of said mass progresses, and an external excitation means for said heating element.

References Cited in the file of this patent

UNITED STATES PATENTS

| | | | |
|---|---|---|---|
| 515,500 | Nobel | Feb. 27, | 1894 |
| 1,209,258 | Bradley | Dec. 19, | 1916 |
| 2,271,307 | Ray | Jan. 27, | 1942 |
| 2,677,332 | Vollenweider | May 4, | 1954 |